Patented June 19, 1945

2,378,794

UNITED STATES PATENT OFFICE 2,378,794

TERPENE RESINS

Alfred L. Rummelsburg, Wilmington, Del., assignor to Hercules Powder Company, Wilmington, Del., a corporation of Delaware No Drawing. Application October 28, 1941, Serial No. 416,863

19 Claims. (Cl. 260—43)

This invention relates to new resinous compositions of matter and to processes for their production, and more particularly to resins prepared by the copolymerization of an acyclic terpene with a phenol-aldehyde resin.

In accordance with this invention, it has been found that an acyclic terpene having three double bonds per molecule may be copolymerized with a phenol-aldehyde type resin to yield solid and viscous liquid resins which possess great utility, particularly in the preparation of protective coating compositions. These new resins are believed to be products of the simultaneous polymerization of the acyclic terpene and condensation of the acyclic terpene and/or polymerized acyclic terpene with the phenol-aldehyde resin. Under the conditions of copolymerization, even the phenol-aldehyde resin employed may undergo some increase in degree of polymerization simultaneously with its condensation with the acyclic terpene and/or polymerized acyclic terpene.

The copolymerization of an acyclic terpene having three double bonds per molecule with a desired phenol-aldehyde resin may be accomplished by heating the reactants at elevated temperatures. Also, the reaction may be facilitated with the use of a metal halide polymerization catalyst, an acid polymerization catalyst, or an activated clay type of polymerization catalyst. Desirably, when a catalyst is employed, the reaction will be carried out with the reactants dissolved in an inert solvent. The reaction mixture will desirably be vigorously agitated for a period sufficiently long to secure a substantial yield of copolymerized product.

There follow several specific examples which illustrate particular embodiments of the principles of this invention which, however, are in no way to be taken as being limiting. All parts and percentages in the specification and claims are by weight unless otherwise indicated.

Example 1

Two hundred parts of an alkali-catalyzed, unmodified p-tertiary amyl phenol-formaldehyde resin (Beckacite 1001) and 250 parts of allo-ocimene were refluxed at 200° C. for about 3 hours under an air condenser. The particular phenolic resin employed was of the heat-hardening and drying oil-reactive type. The allo-ocimene employed contained 60% allo-ocimene and 40% of cyclic terpenes which remained substantially unreactive under the conditions employed. Unreacted constituents of the reaction mixture were removed by reduced pressure using a final bath temperature of 190° C. and a pressure of 15 mm. A resinous copolymer having a drop melting point of 89° C. remained in the amount of 307 parts. A China-wood oil varnish prepared from the resin showed excellent drying characteristics and resistance to ultraviolet discoloration, especially as compared with varnishes containing the unmodified phenolic resin.

Examples 2-9 inclusive

In the following examples copolymers were prepared employing as the acyclic terpene an allo-ocimene of 93% allo-ocimene content. In some, the same type of phenolic resin as employed in Example 1 was used; in others, an acid-condensed, unmodified p-tertiary amyl phenol-formaldehyde resin (known as Amberol ST-137X) was employed as the phenol-aldehyde resin. This latter resin is somewhat less reactive with drying oils than the alkali-condensed resin. The ingredients were heated together under an air condenser. Other conditions of reaction and characteristics of the product are given in the following tabulation:

| Example | Allo-ocimene, parts | p-Tertiary amyl phenol-formaldehyde resin, parts | Reaction time, hours | Reaction temp. °C. | Drop melting point °C. | Type of copolymer |
|---|---|---|---|---|---|---|
| 2 | 150 | Alkali-catalyzed (150) | 1.0 | 200-220 | 37 | Viscous oil. |
| 3 | 100 | Alkali-catalyzed (200) | 0.5 | 200-220 | 90 | Solid resin. |
| 4 | 45 | Alkali-catalyzed (255) | 0.35 | 200-220 | | Do. |
| 5 | 15 | Alkali-catalyzed (285) | 1.0 | 200-220 | | Do. |
| 6 | 150 | Acid-catalyzed (150) | 1.0 | 200-220 | 42 | Soft resin. |
| 7 | 100 | Acid-catalyzed (200) | 1.0 | 200-220 | 59 | Do. |
| 8 | 45 | Acid-catalyzed (255) | 0.5 | 200-220 | 83 | Solid resin. |
| 9 | 15 | Acid-catalyzed (285) | 0.5 | 200-220 | 92 | Do. |

The copolymer resins prepared as aforesaid were tested in varnish compositions. As in the case of the copolymer resin of Example 1, the use of the resins in a China-wood oil varnish imparted excellent drying characteristics and resistance to ultraviolet discoloration.

Example 10

Two hundred parts of alkali-catalyzed, unmodified p-tertiary amyl phenol-formaldehyde resin (Beckacite 1001) and 150 parts of myrcene were dissolved in 200 parts of toluene. The solution was vigorously agitated at 60° C. to 110° C. for a period of 4 hours with 40 parts of fuller's earth which had a particle size of 80 to 100 mesh and which had been calcined at 400° C. for ½ hour prior to use. The solution was filtered from the catalyst, and the toluene removed by steam distillation at about 180° C. to 210° C. Three hundred ten parts of a solid resin having a drop melting point of 120° C. were obtained.

Example 11

One hundred parts of the same type of phenolic resin as employed in Example 10 and 100 parts of the dimer of allo-ocimene having a thiocyanate number of 170 were heated at 160° C. to 220° C. under an air condenser for 1.5 hours. Upon cooling, a solid resin was obtained which had a drop melting point of 115° C.

Example 12

One hundred parts of an alkali-catalyzed, unmodified p-tertiary butyl phenol-formaldehyde condensate and 120 parts of allo-ocimene (93% pure) were dissolved in 200 parts of benzene. The solution was vigorously agitated with 50 parts of aqueous 85% orthophosphoric acid for a period of 24 hours at 30° C. to 45° C. The reaction mixture was then water washed with four 1000-part portions of water at 70° C. which contained about 1% sodium chloride in order to inhibit emulsification. The solvent was removed by heating the reaction mixture for 1 hour at 160° C. to 220° C. while sparging with steam, leaving 200 parts of a solid resin having a drop melting point of 120° C.

Example 13

One hundred parts of an alkali-catalyzed, unmodified p-phenyl phenol-formaldehyde condensate and 120 parts of allo-ocimene (93% pure) were dissolved in 200 parts of benzene. Gaseous boron trifluoride was then introduced into the solution until 25 parts had been absorbed. This amount of boron trifluoride was absorbed over a period of ½ hour while the reaction mixture was being vigorously agitated and held at a temperature of 10° C. to 20° C. The reaction mixture was then allowed to stand for a period of 16 hours at 0° C. to 10° C. and was then water washed with four 1000-part portions of water at 60° C. to 70° C. The solvent was removed by heating the reaction mixture to 160° C. to 220° C. for 1 hour while sparging with steam. One hundred ninety-five parts of a solid resin melting at 130° C. were obtained.

In place of the allo-ocimene or myrcene employed in the examples, other acyclic terpenes having three double bonds per molecule may be used, as ocimene, cryptotaenene, etc. Allo-ocimene is preferred inasmuch as in addition to having three double bonds per molecule it has them in a triply conjugated system. Hereinafter, any acyclic terpene having three double bonds per molecule will be referred to for convenience merely as an acyclic terpene. In place of a pure acyclic terpene or synthetic acyclic terpene mixtures, various terpene mixtures rich in acyclic terpenes may be employed. For example, pyrolyzed α-pinene which may contain as much as 40% allo-ocimene, and pyrolyzed β-pinene which may contain up to 70% myrcene may be employed.

As illustrated in Example 11, it is possible to employ polymers of the aforesaid acyclic terpenes in place of the monomers, and in particular the dimers of the aforesaid acyclic terpenes will be employed. The polymers may be prepared from the monomers by any of the methods known in the art, as by the application of heat alone, or by the application of heat in the presence of catalysts such as phosphoric acid, sulfuric acid, etc.

Various phenol-aldehyde resins may be employed in place of the particular ones utilized in the foregoing examples. Thus the phenolic constituent used in preparing the resin may be a monocyclic monohydric compound, as phenol; a monocyclic dihydric compound, as quinol, catechol, resorcinol, etc.; a monocyclic trihydric compound, as pyrogallol, hydroxy quinol, phloroglucinol, etc.; polycyclic compounds, as α-naphthol, β-naphthol, the dihydroxy naphthalenes, etc.; mono- and polyhydrocarbon substitution products of the foregoing mono- and polycyclic compounds, as the cresols, mesitols, the xylenols, ethyl phenol, propyl phenol, butyl phenol, para-tertiary butyl phenol, isoamyl phenol, para-tertiary amyl phenol, para-phenyl phenol, etc. As the aldehyde, there may be employed formaldehyde, acetaldehyde, paraldehyde, furfuraldehyde, etc. The condensation of a phenol with a desired aldehyde is generally effected in the presence of a catalyst which may be either an acid catalyst as sulfuric acid, hydrochloric acid, phosphoric acid, etc., or an alkaline catalyst as ammonium hydroxide, sodium hydroxide, etc.

In the preparation of the phenol-aldehyde condensate, a wide range of ratio of phenol to aldehyde may be employed, for example, from a ratio of about 1 mol of phenol to about ½ mol of aldehyde to a ratio of about 1 mol of phenol to about 3 mols of aldehyde. The quantity of catalyst used, as understood by those versed in the art, may vary from about approximately 0.1% to 25% on the basis of the weight of the reactants. While the reaction of the phenol and the aldehyde may be carried out in the cold, a temperature between about 0 and about 125° C., preferably 25° C. to 60° C., is preferred.

The illustrative embodiments of the invention have shown that the copolymerization of the acyclic terpene and the desired phenol-aldehyde resin may take place at various temperatures. In general, a temperature between about —60° C. and about 250° C. will be employed for the reaction. When no catalyst is employed, the minimum temperature at which substantial reaction will take place is about 60° C. Preferably, when no catalyst is employed, a temperature between about 170° C. and about 220° C. will be utilized. The reaction will desirably be carried out at atmospheric pressure although not necessarily so. The reactants will be vigorously agitated for a period sufficiently long to give a substantial yield of copolymerized product, preferably between about 0.5 and about 6.0 hours.

As indicated in the examples, a polymerization or condensation catalyst may be employed to facilitate the copolymerization reaction. As such, there may be employed the metal halides, such as, boron trifluoride and its molecular complexes with ethers and acids, titanium chloride, ferric chloride, and the halides of metals whose hydroxides are amphoteric as aluminum chloride, stannic chloride, zinc chloride, etc.; acids, such as, hydrofluoric acid, fluoroboric acid, polybasic mineral acids, as orthophosphoric acid, tetraphosphoric acid, sulfuric acid, etc., acyl sulfuric acids, as acetyl sulfuric, alkyl sulfuric acids, as ethyl sulfuric acid, para-toluene sulfonic acid, acetic acid, etc.; activated clays, such as, fuller's earth, diatomaceous earth, alumina, bauxite, synthetic magnesium silicates, etc.

Of the above-mentioned metal halide catalysts, the preferred ones are boron trifluoride and its molecular complexes with ethers and acids. When the aforementioned polybasic inorganic acids are employed as catalysts, they may be employed in the substantially pure state or in aqueous solutions of at least 60% acid concentration. The activated clays will desirably be calcined at temperatures of, for example, from 100° C. to 500° C. prior to use.

Generally, the catalyst to reactant ratio employed may vary between about 0.001 and about 1.0. The operable temperature when employing a catalyst may vary from about −60° C. to about 250° C., and the operable reaction period may vary from about 1 to about 400 hours. Moreover, it is preferred when a metal halide or acid catalyst is employed, to use a catalyst to reactant ratio between about 0.02 and about 0.25, a reaction temperature between about −20° C. and about 80° C., and a reaction period between about 2 hours and about 24 hours. When an activated clay is employed as the catalyst, it is preferred to use a catalyst to reactant ratio between about 0.05 and about 0.5, a reaction temperature between about 80° C. and about 200° C., and a reaction period between about 3 and about 8 hours.

Although various ratios of acyclic terpene to phenolic resin may be employed, it is generally preferred to employ the acyclic terpene in an amount between about 15% and about 85% of the total weight of the reactants, with the phenolic resin being employed in a corresponding amount of between about 85% and about 15% of the total weight of the reactants.

As illustrated in the examples, various inert solvents may be employed. In general, aliphatic hydrocarbons, such as, gasoline, petroleum naphtha, butane, pentane, etc.; aromatic hydrocarbons, such as, benzene, toluene, xylene, etc.; cyclic hydrocarbons, such as, cyclohexane, decahydronaphthalene, etc.; esters, such as, methyl acetate, ethyl acetate, propyl acetate, isopropyl acetate, n-butyl acetate, etc.; halogenated hydrocarbons, such as, chloroform, ethylene dichloride, carbon tetrachloride, trichloroethylene, ethyl chloride, methylene chloride, etc., may be employed. In conjunction with the use of metal halide catalysts, the halogenated hydrocarbon and the aromatic hydrocarbon solvents are preferred, with the halogenated hydrocarbons, such as, ethyl chloride and ethylene chloride, being most preferred.

The illustrative examples have indicated several procedures for treating the reaction mixture to obtain the copolymer resin. When a catalyst has not been employed, the mechanism is quite simple, the unreacted constituents and any inert solvent being removed preferably by reduced pressure distillation. When a metal halide or acid catalyst is used, the removal of the same may be accomplished by washing with water, an aqueous alkali, or an aqueous inorganic acid. The aqueous inorganic acid wash is particularly desirable inasmuch as it assists in breaking up catalyst-copolymer complexes. Following the aqueous alkali or acid wash, it is desirable to wash with water to remove all traces of alkali or acid. Final traces of catalyst-copolymer complexes may be removed by the use of adsorbents, such as, fuller's earth, activated carbon, silica gel, bauxite, etc. Finally, the solvent, if one has been used, and any unreacted constituents are removed, desirably by vacuum distillation using, if necessary, a final bath temperature of about 170 to 220° C.

The copolymer resins resulting from the application of the foregoing processes vary from highly viscous liquids to hard, brittle solids. Their solubility characteristics are such that they may be dissolved in solvents, such as, benzene, toluene, xylene, turpentine, ethylene chloride. They are only partially soluble in ethyl alcohol, acetone, etc.

The color of the resinous products of the invention may be improved by utilizing acyclic terpenes which have been distilled from caustic. Also, the use of an inert atmosphere such as $CO_2$, $N_2$, etc., during the reaction period leads to the production of pale-colored products. Further refinement may be accomplished by treatment with the adsorbents hereinbefore mentioned, by the use of selective solvents, as furfural, furfuryl alcohol, phenol, etc. Furthermore, the copolymer resins may be subjected to vacuum distillation to remove the more volatile copolymers, leaving copolymer residues having higher melting points than the initial copolymerized product.

The copolymer resins resulting from the application of the aforesaid processes are of primary utility in the preparation of protective coating compositions, as paints, lacquers, varnishes, etc. These resins are suitable for use in varnishes and paints inasmuch as they are compatible with drying and semidrying oils. In fact, many phenolic resins which are themselves incompatible with drying oils can be converted into drying oil-compatible resins by virtue of the processes described herein. Since these copolymer resins adhere well to metal, wood, paper and textiles, they may be utilized as adhesives or as laminating agents with or without the aid of suitable plasticizing agents.

As compared with phenolic resins, the copolymer resins are significantly characterized by the fact that they impart excellent resistance to ultraviolet discoloration to varnishes. This is readily apparent from the following tabulation. China-wood oil varnishes of 33 gallon oil length were made up utilizing some of the copolymer resins of the examples. Films were cast on glass plates and submitted to ultraviolet light. The following ratings resulted with No. 1 indicating the greatest discoloration:

| Varnish containing | Rating |
|---|---|
| Amberol ST-137-X | 1 |
| Resin of Ex. 9 | 5 |
| Resin of Ex. 8 | 4 |
| Resin of Ex. 7 | 2 |
| Resin of Ex. 6 | 3 |

Varnishes containing the copolymer resins also showed improved drying characteristics as compared with similar varnishes prepared from straight phenolic resins.

It will be understood that wherever in this specification reference is made to the melting point of a resinous material, a melting point determined by the Hercules drop method is indicated.

What I claim and desire to protect by Letters Patent is:

1. A product of the copolymerization of a preformed phenol-aldehyde resin and a material selected from the group consisting of the monomers and polymers of acyclic terpenes having three double bonds per molecule.

2. A product of the copolymerization of an acyclic terpene having three double bonds per molecule and a preformed phenol-aldehyde resin.

3. A product of the copolymerization of an acyclic terpene having three double bonds per molecule and a preformed phenol-formaldehyde resin.

4. A product of the copolymerization of allo-ocimene and a preformed phenol-formaldehyde resin.

5. A product of the copolymerization of myrcene and a preformed phenol-formaldehyde resin.

6. A product of the copolymerization of allo-ocimene and a preformed para-tertiary butyl phenol-formaldehyde resin.

7. A product of the copolymerization of allo-ocimene of a preformed para-tertiary amyl phenol-formaldehyde resin.

8. A product of the copolymerization of myrcene and a preformed para-tertiary amyl phenol-formaldehyde resin.

9. The process which comprises copolymerizing a preformed phenol-aldehyde resin and a material selected from the group consisting of the monomers and polymers of acyclic terpenes having three double bonds per molecule at a temperature between about −60° C. and about 250° C.

10. The process which comprises copolymerizing a mixture of an acyclic terpene having three double bonds per molecule and a preformed phenol-aldehyde resin at a temperature between about 60° C. and about 250° C.

11. The process which comprises copolymerizing a mixture of an acyclic terpene having three double bonds per molecule and a preformed phenol-aldehyde resin at a temperature between about 170° C. and about 220° C.

12. The process which comprises copolymerizing a mixture of an acyclic terpene having three double bonds per molecule and a preformed phenol-aldehyde resin, in the presence of a polymerization catalyst, at a temperature between about −60° C. and about 250° C.

13. The process which comprises copolymerizing a mixture of an acyclic terpene having three double bonds per molecule and a preformed phenol-aldehyde resin, in the presence of a metal halide polymerization catalyst, at a temperature between about −60° C. and about 250° C.

14. The process which comprises copolymerizing a mixture of an acyclic terpene having three double bonds per molecule and a preformed phenol-aldehyde resin, in the presence of a metal halide polymerization catalyst, at a temperature between about −20° and about 80° C.

15. The process which comprises copolymerizing a mixture of an acyclic terpene having three double bonds per molecule and a preformed phenol-aldehyde resin, both of which reactants are dissolved in an inert halogenated solvent, in the presence of a metal halide polymerization catalyst, at a temperature between about −20° C. and about 80° C.

16. The process which comprises copolymerizing a mixture of an acyclic terpene having three double bonds per molecule and a preformed phenol-aldehyde resin, in the presence of an acid polymerization catalyst, at a temperature between about −60° C. and about 250° C.

17. The process which comprises copolymerizing a mixture of an acyclic terpene having three double bonds per molecule and a preformed phenol-aldehyde resin, in the presence of an acid polymerization catalyst, at a temperature between about −20° C. and about 80° C.

18. The process which comprises copolymerizing a mixture of an acyclic terpene having three double bonds per molecule and a preformed phenol-aldehyde resin, in the presence of an activated clay as a polymerization catalyst, at a temperature between about −60° C. and about 250° C.

19. The process which comprises copolymerizing a mixture of an acyclic terpene having three double bonds per molecule and a preformed phenol-aldehyde resin, in the presence of an activated clay as a polymerization catalyst, at a temperature between about 80° C. and about 200° C.

ALFRED L. RUMMELSBURG.